Jan. 30, 1934. T. A. McCANN 1,944,991
TWO-WAY TELEGRAPH SYSTEM
Filed Dec. 7, 1932 3 Sheets-Sheet 1
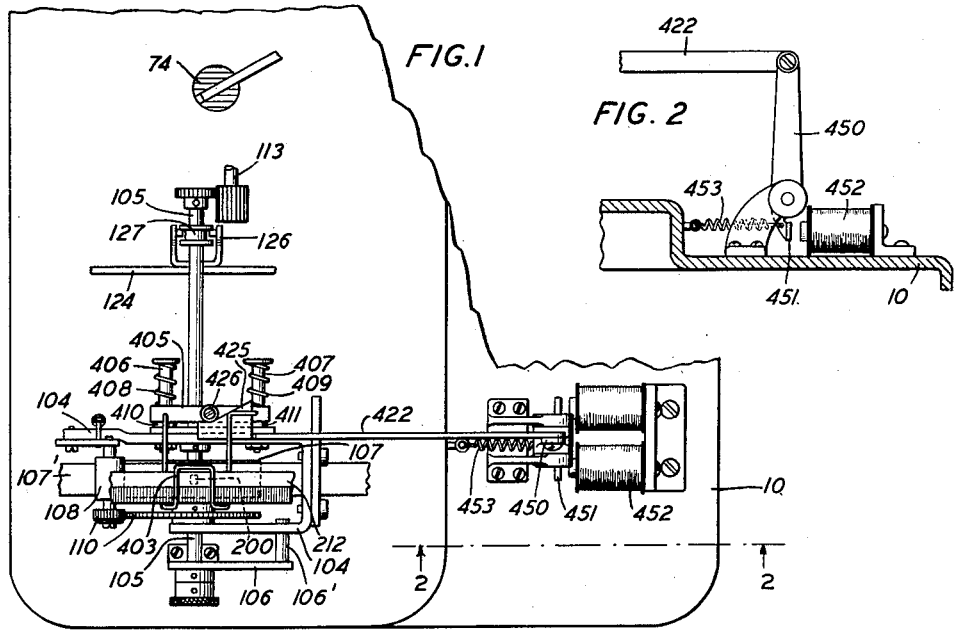
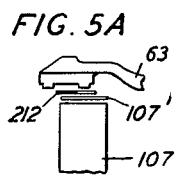 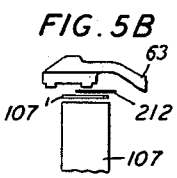 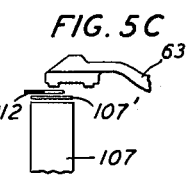 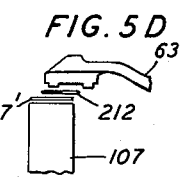
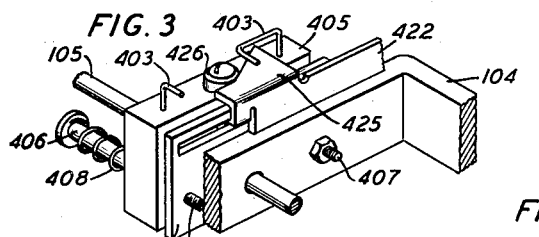
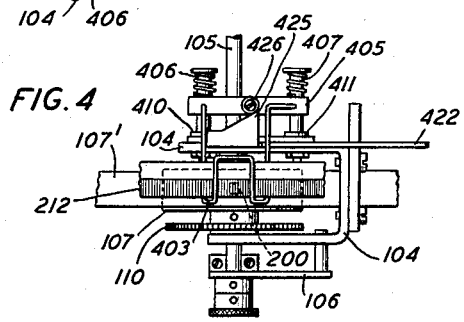
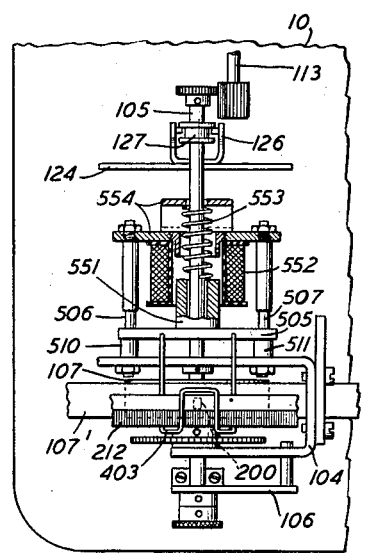
INVENTOR
T. A. MC CANN
BY
ATTORNEY Jan. 30, 1934.   T. A. McCANN   1,944,991
TWO-WAY TELEGRAPH SYSTEM
Filed Dec. 7, 1932   3 Sheets-Sheet 2
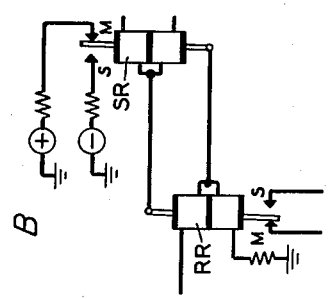
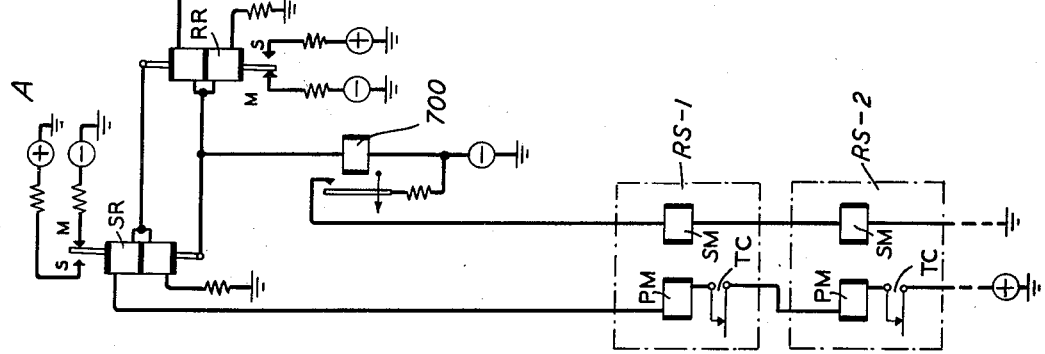
FIG. 7
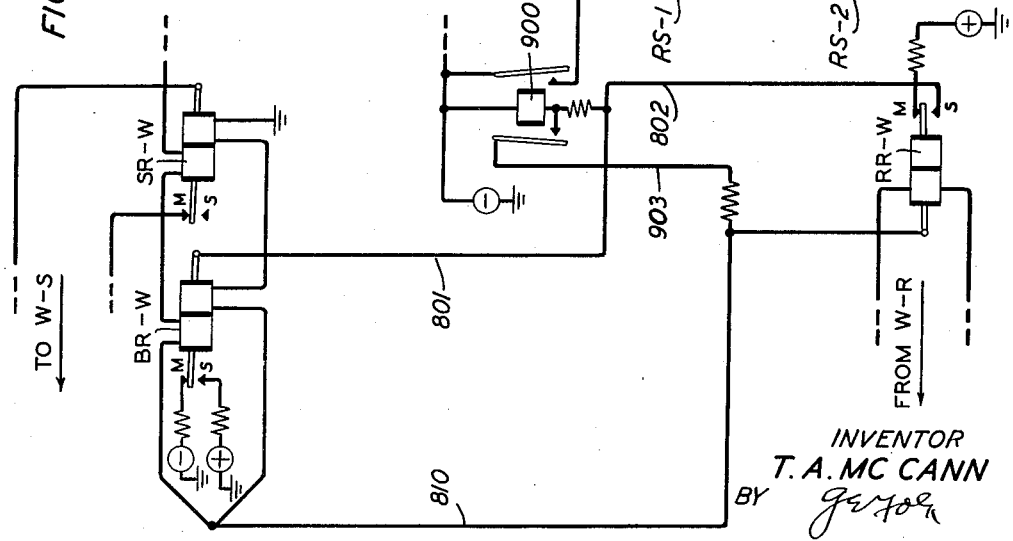
FIG. 9
INVENTOR
T. A. MC CANN
BY
ATTORNEY Jan. 30, 1934. T. A. McCANN 1,944,991
TWO-WAY TELEGRAPH SYSTEM
Filed Dec. 7, 1932  3 Sheets-Sheet 3

INVENTOR
T. A. MC CANN
BY
ATTORNEY

Patented Jan. 30, 1934

1,944,991

UNITED STATES PATENT OFFICE 1,944,991

TWO-WAY TELEGRAPH SYSTEM

Thomas A. McCann, East Orange, N. J., assignor to American Telephone and Telegraph Company, a corporation of New York Application December 7, 1932. Serial No. 646,202

7 Claims. (Cl. 178—23)

This invention relates to two-way telegraph systems and more particularly to systems of this kind in which record is made of messages passed in both directions.

It is an object of the invention to record the messages so that the record of messages passed in one direction may be readily distinguished from the record of messages passed in the other direction.

It is another object to provide for electromagnetic control of the distinguishing mechanism in order that the control may be exerted by the line signals passed in either direction.

It is a further object of the invention to provide for remote control of the distinguishing mechanisms on a plurality of recording devices, each adapted for recording of messages passed in both directions.

In accordance with a feature of the invention circuit means included in the line circuit of a telegraph system, are utilized for controlling the differentiating characteristics of the printer mechanism adapted for recording messages passing in both directions, which circuit means comprise relay means associated with the line circuit by means of a bridge circuit to be responsive only to signals passing in one direction.

In accordance with another feature the circuit means for controlling the differentiating characteristic of the recorded messages include additional relay means for control of a shift mechanism on one or more recording printers each, by their shift mechanism, adapted to record messages in at least two distinctly observable manners, the printers otherwise being connected to the line circuit to each make a single continuous record of all messages.

The invention in a preferred form is readily applicable to the structure disclosed in Patent 1,833,953, issued to E. F. Watson and T. A. McCann on December 1, 1931. In accordance with the disclosure in that patent a printing telegraph recorder is arranged for two-color printing in both upper and lower cases by means of a shift mechanism for the two-color ribbon which, through mechanical means, is operated by the local impulse transmitter and more particularly by a cam on the transmitting distributor. At the transmission of a message from the local transmitter, the transmitting distributor operates the shift mechanism to cause the whole record to be printed in one color. Signals incoming over the line are received by the printer magnet for control of the character selecting mechanism, including the receiving distributor, without affecting the color shift mechanism; incoming messages consequently are printed in the other color.

In accordance with a further feature of the invention, a recording printer with two-color shift mechanism for both upper and lower cases, such as described in the patent referred to, is provided with electromagnetic operating means independent of both the local transmitting mechanism and the receiving mechanism of the printer, and circuit means are provided for control of said electromagnetic means by remotely located signal transmitters or, in other words, by signals arriving at the station over different lines.

In accordance with a more specific feature of the invention the controlling relay means for the shift mechanism has a slow operating characteristic for maintaining one control during the continual signaling in one direction and for maintaining another control during a prolonged absence of signals in that direction or during signaling in the other direction.

The invention is particularly applicable to any of the well known types of duplex telegraph repeaters widely used in land line telegraph systems and is also adaptable for use in the terminal stations for communication systems operated over long submarine cables or trans-oceanic radio links. It has been customary for monitoring purposes in such systems to produce records of the messages passed through the repeaters, and it has been found desirable that the records should indicate the direction in which each message was transmitted, as by recording the messages in two different colors.

The telegraph repeater equipment may embrace equipment for a plurality of transmission channels, as in carrier frequency systems. The several telegraph channels in repeaters of this type have their individual filter and detector equipment and associated therewith may be a direct current duplex bridge circuit in which a sending relay and a break relay is provided for each direction of transmission. The connecting duplex bridge circuit is under control of a west and an east receiving relay which are responsive, respectively, to signals received in the two directions.

The operating magnet of the local recording printer is connected in series with the duplex circuit and thus causes the machine to record the messages passing in either direction. The color shift control in accordance with the invention may be accomplished by means of additional control relay means which may be connected to the telegraph channel in different ways; these relay means in a preferred arrangement are controlled by the armature of one of the break relays and thus are operated only while the message to which that break relay is responsive are being received. These relay means in a preferred arrangement are of the slow release type, and thus do not follow the signals but remain in operated condition until the direction of transmission is reversed. This same characteristic may be obtained by providing a locking arrangement, which is interrupted for release of the control relay means when the direction of transmission is reversed, which arrangement forms no part of the invention.

The control relay means may be common to the shift mechanisms on a plurality of printers located at the repeater point and the printers may be connected to the duplex bridge circuits in any convenient manner, usually by plugs and jacks, for recording of messages in both directions.

The invention is applicable to telegraph systems other than the carrier system given as an example above and is readily applicable to teletypewriter systems such as used in offices of brokers or commercial houses, where it would be desirable to distinguish between incoming and outgoing messages on a number of printers located in different departments and connected in a single circuit. The invention is also applicable to printers other than that disclosed in Patent 1,833,958, for recording messages in characteristically different manners.

The following more detailed description of certain preferred forms of the invention should be read in connection with the accompanying drawings in which Figures 1 to 5 illustrate a printing mechanism, and particularly the shift mechanism thereof, similar to that shown in Fig. 8 of Patent 1,833,958 and modified for the purposes of this invention:

Fig. 1 is a plan elevation;

Fig. 2 is a partial sectional view taken on line 2—2 of Fig. 1;

Fig. 3 is a perspective view of a part of the shift mechanism;

Fig. 4 is a plan view showing the ribbon shift mechanism in operated position; and Figs. 5—A to D are diagrammatical representations of the possible positions of the color ribbon with respect to the printing elements;

Fig. 6 illustrates an alternative form of the shift mechanism;

Figs. 7 to 9 are circuit diagrams showing different circuit arrangements in accordance with the invention.

Figure 8:
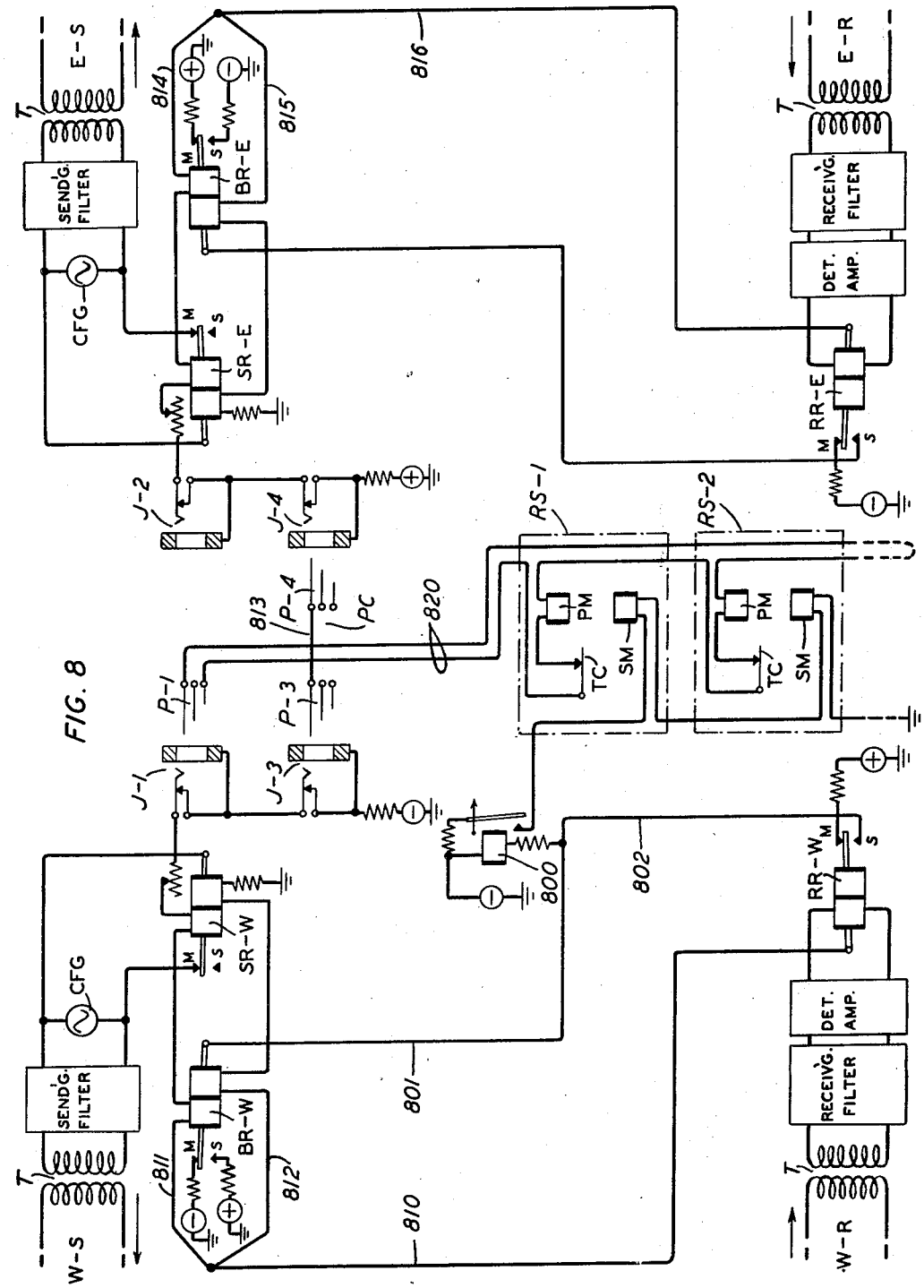

A description will first be given of the shift mechanism for a telegraph printer arranged in accordance with a preferred form of the invention; the description refers particularly to Figs. 1 to 5. For a full understanding of the operation of the complete printer reference is made to the disclosure in Patent 1,745,633 Morton and Krum issued February 4, 1930. Only such parts of the device, shown in that patent, are referred to in the following description and shown in the attached drawings as are necessary to facilitate an understanding of the features of the present invention.

The printer mechanism, which is that of a start-stop type bar printer, is mounted on a base 10 and comprises a motor, not shown, which through the plunger 74 operates the type bar mechanism and through shaft 113 operates the feed mechanism for the paper tape 107' and the color ribbon 212.

The type bar mechanism is operated once for each code combination arriving over the line circuit to print in the printing space 200 by a selected type bar striking through the color ribbon 212 onto the paper tape 107' against the platen 107.

The feed mechanism for the paper tape includes the platen 107 mounted in the platen frame 104 which in turn is loosely mounted on the axially slidable shaft 105; the frame 104 is mounted to partake in the axial movement of the shaft 105 but is prevented from rotating with the shaft by means of pin 106' on the bracket 106 which is mounted on the base 10. The paper tape 107' passes through suitable guides, not shown, which are mounted on the platen frame and cause the tape to follow the cylindrical surface of the platen; the spring pressed roller 108, also mounted in platen frame 104 insures frictional contact with the tape and the platen. After each printing operation the shaft 113 is rotated by a short step and through gearing rotates shaft 105, platen 107, gears 110 and roller 108 to advance the tape on step for the next character.

The shifting, from one case to the other, of the platen frame 104 with its various elements takes place in response to certain signal codes. The code for "shift" results in the selection of a stunt bar, not shown, which through the upward movement of plunger 74 operates the bail 124, which in turn through fork 126 engaging grooved collar 127 imparts an axial movement to the shaft 105 in a direction away from plunger 74, thereby shifting the platen frame and the platen to the uppercase position. The platen frame remains in its shifted position until a code signal for "unshift" causes the selection of another stunt bar, not shown, which through the upward movement of plunger 74 operates bail 124, fork and collar 127 to impart an axial shift of the shaft 105 in a direction toward the plunger 74, thereby returning the platen frame and the platen to the lower case position.

Referring now to the color ribbon guide and the shifting mechanism therefor, the ribbon 212 is a two color ribbon and it is kept in alignment with the printing space 200 by ribbon guide 403 which is mounted on the ribbon carriage 405; the latter is slidably mounted on posts 406 and 407 fastened to platen 104. As shown in Fig. 1 the ribbon carriage 405 under the pressure of springs 408 and 409 is held in its normal position against the enlarged portions 410 and 411 of the posts 406 and 407 in which position one side, the red, of the ribbon is alinged with the printing space 200 both in the upper and in the lower case.

For the purpose of shifting the ribbon, with respect to the platen and the printing space 200, an electromagnet 452 is mounted in the base 10 and has a suitably pivoted armature 451 to which is fastened an arm 450 and a return spring 453. A bar 422 is connected to the arm 450 and its left-hand end is slidably mounted on a portion of the platen carriage 104 for movement transverse of the printer shaft 105; and at this end the bar 422 carries an angular extension 425 which has a cam surface contacting with a roller 426 mounted on the ribbon carriage 405. Thus whenever magnet 452 is energized and attracts its armature the arm 450 will move bar 422 to the left, whereby the camming surface of extension 425 will cause the roller 426 to force the ribbon carriage to slide a short distance on posts 406 and 407 against the tension of the springs 408 and 409. In this shifted position the ribbon carriage 405 through the ribbon guide 403 positions the color ribbon so that its black side will be aligned with printing space 200 as shown in Fig. 4. When the magnet 452 is deenergized and spring 453 causes the return of the bar 422, the roller 426 and ribbon carriage 405 will return to their normal positions under pressure of springs 408 and 409. The shifting of the ribbon carriage 405 as just described may be brought about both in the upper and lower case positions of the platen frame 104 and the bar 422 is of sufficient length to not interfere with these movements.

In Fig. 5 the different relative positions of the color ribbon and of the upper and lower case positions of the paper are illustrated diagrammatically. Thus Figs. 5—A and B show conditions in the lower case for printing red and black respectively and Figs. 5—C and D show the corresponding conditions in the upper case. In these figures the end only of the type bar 63 has been shown.

Referring now to the alternative form of the ribbon shift mechanism shown in Fig. 6, the ribbon guide 403 is mounted on ribbon carriage 505; the latter is slidably mounted on posts 506 and 507 fastened on the platen frame 104; at their free ends the posts 506 and 507 carry a mounting 554 for a solenoid 552 surrounding the shaft 105. The ribbon carriage 505 has attached thereto a plunger 551 which surrounds the shaft 105 and extends into the interior of the solenoid 552; a return spring 553 between the mounting 554 and plunger 551 holds the ribbon carriage 505 in normal position engaging enlarged portions 510 and 511 on the posts 506 and 507 respectively, in which position the black side of the color ribbon is aligned with the printing space 200. Upon energization of solenoid 552, the plunger 551 is drawn into the selonoid thereby shifting the ribbon carriage 505 with the ribbon guide 403 to place the black side of the ribbon in alignment with the printing space 200; upon deenergization of solenoid 552 the spring 553 will return these parts to their normal position.

The start-stop telegraph printer provided with shift mechanism, such as described above, may for the purposes of the invention be used in different types of telegraph systems. The following description will be directed to this aspect of the invention.

The system shown in Fig. 7 comprises a line L interconnecting stations A and B. The line circuit of station A includes the sending contacts of sending relay SR, and the windings of receiving relay RR connected in a differential bridge circuit to be responsive to incoming impulses and unresponsive to outgoing impulses. The station B may have a line circuit similarly equipped of which, however, only the sending contacts of the sending relay and the windings of receiving relay RR are shown.

With the circuit in the condition shown in Fig. 7 normal line current flows in the line circuit from minus at the sending relay SR at station A through upper winding of relay RR, over the line L to plus at station B; a smaller biasing current also flows through the lower winding of relay RR tending to move the armature to spacing position.

Assuming that relay SR at station A is operated to send a signal and applies a plus potential to the line circuit, the line current reduces to zero. The receiving relay RR remains in its marking position, since the biasing current in its lower winding has been reversed; when the sending relay returns to its marking position relay RR remains in marking position. When station B operates its sending relay in transmitting a message and thereby places a minus potential on the line circuit, the line current is reduced to zero. In this case the biasing current in receiving relay RR is not reversed, and in the absence of an opposing line current this relay operates to spacing.

As shown in Fig. 7 station A may be equipped with a plurality of recording stations, designated as RS—1 and RS—2 in the drawings. Each recording station comprises a printing mechanism, such as that referred to above, having a printer magnet PM for the selective control of the type bar mechanism and a shift magnet SM for shifting of the color ribbon. Each station may also be equipped with a transmitting keyboard of the start-stop type, such as that shown in Patent 1,595,472 to Krum, issued August 10, 1926. The transmitting contacts associated with the keyboard are shown diagrammatically at TC at each recording station and are interconnected in a series circuit through both windings of the sending relay SR which consequently responds to the manipulations of the keyboards and transmits the messages over the line without affecting relay RR as described above. The printing magnets PM are also included in this series circuit and consequently will cause the printers to record the outgoing messages.

The windings of sending relay SR are connected in a differential bridge circuit, the apex of which is connected to the armature of receiving relay RR; relay SR consequently does not respond to operations of relay RR. The printer magnets PM will however be operated by relay RR for recording of incoming messages. It will thus be seen that the printer magnets respond to messages in both directions, whereas the sending relay discriminates between the directions of transmission.

The shift magnets for the color ribbon are connected in a series circuit to contacts on a slow releasing relay 700, the winding of which will be energized in the spacing position of relay SR to connect battery to the shift magnets SM. Thus when messages are incoming to station A and relay SR remains in marking position the relay 700 remains deenergized and the color ribbons of the printers will be aligned for printing in red.

Relay 700 is of the slow releasing type and is adjusted to be sufficiently slow in releasing its armature to hold its armature over the ordinary signaling intervals. When during transmission of signals from station A, relay SR operates to spacing, relay 700 will operate and being slow to release will hold its armature attracted during the marking intervals of relay SR. Relay 700 connects battery to the shift magnets SM, and will maintain the battery connected until released during a prolonged marking interval. Thus during transmission from station A to station B the color ribbons on the printers at station A will be shifted for printing in black, thereby differentiating from the printing of messages from station B to station A which, as explained above, will be recorded in red.

The invention will now be described in connection with Fig. 8 as being applied to a carrier communication system which includes terminal stations and one or more intermediate stations located along the line at suitable intervals.

The circuit arrangement illustrated in Fig. 8 is that of an intermediate or repeater station and includes the equipment for two telegraph channels, one for each direction of transmission. Thus the east receiving channel E—R connects through transformer T, receiving filter, detector and amplifier to receiving relay RR—E and the corresponding west sending channel W—S is connected through transformer T, sending filter, carrier frequency generator CFG to the contacts of sending relay SR—W; similarly the west receiving channel W—R connects through transformer T, receiving filter, detector and amplifier to receiving relay RR—W and the corresponding east sending channel E—S is connected through transformer T, sending filter, carrier frequency generator CFG to the contacts of sending relay SR—E.

A half duplex bridge circuit interconnects the receiving and sending relays and includes the windings of sending relays SR and break relays BR for the west and east ends of the bridge circuit and a number of monitoring jacks J, of which jacks J—3 and J—4 are normally interconnected by the patching cord PC by the insertion of plugs P—3 and P—4.

The condition shown in the drawings corresponds to normal line condition in the absence of signals, all the relays being in marking position. Thus normal operating current may be traced from plus at relay RR—W over conductors 810 and 811 through operating windings of break relay BR—W and sending relay SR—W over jacks J—1 and J—3, conductors 813 of patching cord PC, jacks J—4 and J—2, operating windings of relays SR—E and BR—E and conductors 814 and 816 to minus at receiving relay RR—E. At the same time biasing currents flow over conductors 812 and 815 through the biasing windings of the relays BR and SR to ground; the biasing current is ordinarily of about half the strength of the operating current and under the condition described is opposed thereto.

Assuming that a signal arrives over the channel E—R to operate relay RR—E to spacing, this relay then applies plus from relay BR—E over its spacing contacts to conductor 816 thereby reducing the operating current in the duplex circuit to zero and reversing the direction of biasing current over conductor 815; relays SR—E and BR—E consequently remain in marking position whereas relays BR—W and SR—W are operated to spacing position by their biasing current. When relay RR—E returns to marking position relays BR—W and SR—W return to marking position.

Similarly when signals arrive over channel W—R to operate relay RR—W, the relays SR—E and BR—E will respond whereas relays BR—W and SR—W remain in marking position.

The operation of relays SR—W and SR—E causes the retransmission of signals over their respective channels W—S and E—S.

It has been the practice to make a record of messages passing in either direction through a repeater station, such as that shown in Fig. 8, and the records have been duplicated on a number of printers located at different parts of the station. In the drawings two recording stations RS—1 and RS—2 are shown, which are similar to those shown in Fig. 7. The printing magnets PM of the printers are included in a common circuit 820 which may be connected into the common portion of the duplex circuit by the insertion of plug P—1 into jack J—1; the printers consequently will record the messages passing in both directions. Each or any of the printers may be combined with a transmitting keyboard, the transmitting contacts TC ordinarily being serially included in the circuit 820. The recording printers are equipped with shifting magnets SM for the color ribbon, which are connected in a circuit over the armature of slow release relay 800 to negative potential. The winding of relay 800 is connected to the armature of break relay BR—W.

It is the practice in systems of this type to send a break signal from the station which is receiving when that station desires to interrupt the sender and reverse the direction of transmission. This is accomplished in a well known manner, the break signal being usually transmitted by applying a steady spacing potential over the line for a time considerably longer than the spacing intervals of the ordinary signaling frequency.

Let it be assumed that signals are incoming on the channel E—R and are being retransmitted over the channel W—S. When break relay BR—W is in spacing position, current will flow from plus over conductor 801 through relay 800 to minus and relay 800 operated to connect minus potential to the grounded shift magnets thereby causing the printers to print in black from messages passing from east to west. Relay 800, being slow to release, will not release during the short signaling intervals when relay BR—W is in marking position. When now a break signal arrives over channel W—R to operate relay RR—W to its spacing position for the length of time of several signals, and assuming first that relays RR—E and BR—W happen to both be in marking position, the operating circuit may be traced from minus to relay BR—W, conductors 801 and 802, contacts of relay RR—W, conductor 811, operating windings of relays BR—W and SR—W, the circuit 820 including the printer magnets, conductor 813, operating windings of relays SR—E and BR—E, conductors 814 and 816 and contacts of relay RR—E to minus; consequently no operating current will be flowing; the biasing current flows over conductor 812 through the biasing windings of relays BR—W and SR—W in a direction, reversed by the operation of relay RR—W, to hold these relays in their marking position; the biasing current over conductor 815 through the biasing windings over relays BR—E and SR—E is not reversed and consequently causes the operation of these relays to their spacing position. Relay RR—E will now have minus potential on both its marking and spacing contacts and consequently will not be able to operate relays SR—W and BR—W from their marking positions. With the sending relay SR—E now operated to its spacing position the break signal will be retransmitted over the channel E—S, and no message will be received over channel E—R. After a short interval, about one-third second, the relay 800 will release its armature and the printers will be shifted to print in red when the message from west arrives over channel W—R.

If, however, at the time of arrival of the break signal and the operation of relay RR—W to its spacing contact the relays RR—E and BR—E had happened to be in their spacing positions the operating current would also be reduced to zero in the duplex circuit by the application of plus potential to both ends thereof from the break relays BR—W and BR—E. In this case, however, the biasing current over conductor 812 would not be reversed and relays BR—W and SR—W would be held in their spacing positions; at the same time the biasing current over conductor 815 would be reversed and maintain relays SR—E and BR—E in their marking positions. This condition will prevail only for the time of the spacing signal on the channel E—R, because when relay RR—E returns to its marking position relays BR—W and SR—W will be operated to their marking positions where they, as described above, will remain irrespective of operations of relay RR—E during the break signal on channel W—R; relays SR—E and BR—E will then also operate as described above to retransmit the break signal over the channel E—S.

During the subsequent retransmission of signals from west to east, relays BR—W and SR—W will remain in their marking positions, thereby causing relay 800 to remain deenergized and causing the printers to print in red, and relays SR—E and BR—E will retransmit over channel E—S.

When now a break signal arrives over the channel E—R, relays SR—E and BR—E will be held in their marking positions in the same manner as described above for relays BR—W and SR—W, and these latter relays will be operated to their spacing positions, relay SR—W retransmitting the break signal over the channel W—S and relay BR—W causing the energization of relay 800 to prepare the printers for printing in black. When now a message is retransmitted from east to west, relay 800 due to its slow release action remains energized during the operation of relay BR—W.

Fig. 9 shows a portion of the circuit shown in Fig. 8, as will be readily seen from an inspection of the drawings, with an alternative arrangement for the relay 800 in Fig. 8. In this arrangement the relay, here designated 900, has no slow acting feature, but by being self-locking over the conductor 903 and the armature of relay RR—W it will remain energized independent of the operations of relay BR—W during transmission from east to west. During transmission from west to east relay BR—W applies minus potential to relay 900 which consequently will not operate. In other respects the circuit arrangement according to Fig. 9 operates similar to that of Fig. 8.

Certain other modifications of the circuit arrangements described above as well as other combinations of the elements constituting the described circuit arrangements may obviously be devised by one skilled in the art without departing from the spirit of the invention.

What is claimed is:

1. A two-way signaling system comprising a single character recorder for recording the characters of messages transmitted in both directions in said system, electromagnetic instrumentalities having two different conditions of operation corresponding to transmission in the two directions respectively and a device associated with said recorder and connected to said instrumentalities for introducing a characteristic into said recorder characters in response to one of said conditions of operation of said instrumentalities.

2. A two-way signaling system having a line circuit, a single character recording instrument for recording the characters of outgoing and incoming messages on said line circuit, electromagnetic differentiating instrumentalities having two operating conditions, one of which corresponds to sending and the other to receiving over said line circuit, in combination with a supplemental device for introducing a characteristic into said recorded characters indicating whether they form part of an outgoing or of an incoming message and connections between said differentiating instrumentalities and said supplementary device whereby the former is controlled according to the condition of the latter.

3. A telegraph system comprising a telegraph station, a plurality of line circuits connected to said station, common recording instrumentalities at said station for messages transmitted over said line circuits including selective mechanism for imparting different characteristics to the recorded messages representative of the different line circuits respectively over which the recorded messages are transmitted, electromagnetic means for operating said mechanism and signal responsive contact means associated with said line circuit for selective operation of said electromagnetic means.

4. A telegraph system comprising a telegraph station, a transmission channel through said station for transmission in opposite directions, a recording instrument for messages over said channel, a mechanical device electromagnetically operable for modifying the record by said instrument to be characteristically different for the two directions of transmissions, and relay means connected into said channel to be responsive to transmission in one direction only for operation of said device to modify the record in one sense.

5. A two-way telegraph system comprising a telegraph station, a transmission channel through said station for east and west messages, a printer for recording in upper and lower cases of said messages in different colors in accordance with the direction of said messages and having color shift mechanism effective in both of said cases, electromagnetic means for operation of said shift mechanism independent of case shift, first relay means responsive only to transmission of east messages, second relay means responsive only to tranmission of west messages, circuit means from said relay means to said electromagnetic means and said printer, whereby said color shift mechanism is controlled for recording east messages in one color and west messages in a different color.

6. A two-way telegraph system comprising a telegraph repeater station, a transmission channel through said station for east and west messages, an upper and lower case recording device for printing said messages in two colors independent of case and having shift mechanism for two-color ribbon, electromagnetic control means for said shift mechanism and relay means responsive to signal impulses transmitted in one direction only for operation of said electromagnetic means, whereby messages will be printed in one color, and non-responsive to signal impulses transmitted in the other direction to release said electromagnetic means, whereby messages will be printed in the other color, said electromagnetic control means being slow releasing to remain continuously operated over signal variations of signal frequency.

7. A two-way telegraph system comprising a telegraph repeater station, a transmission channel through said station for east and west messages, a plurality of recording devices each adapted for printing said messages in two colors and having shift mechanism for two-color ribbon, electromagnetic operating means for each of said shift mechanisms, a two-way bridge circuit included in said channel, first relay means responsive to transmission in one direction in said bridge circuit, second relay means responsive to transmission in the other direction in said bridge circuit, and control relay means for said shift mechanisms connected to said first relay means for maintaining said shift mechanisms operated for printing in one color during a continual operation of said first relay means and for restoring said shift mechanisms to print in the other color during a continual operation of said second relay means, said control relay means having a slow operation for maintaining the shift control between signal impulses of about normal frequency.

THOMAS A. McCANN.